Patented Apr. 21, 1953

2,635,963

UNITED STATES PATENT OFFICE 2,635,963

MEAT PRODUCT

Elmer F. Glabe, Chicago, Ill., assignor to Food Technology, Inc., Chicago, Ill., a corporation of Illinois No Drawing. Application October 17, 1949, Serial No. 121,893

20 Claims. (Cl. 99—108)

This invention relates in general to the preparation of meat products, and more particularly to a comminuted meat product and a method for making the same, and to a novel composition for assisting in the combining of the ingredients into a homogeneous mass.

Large quantities of comminuted meat products are made and sold by the meat packing industry, mainly in the form of cooked and uncooked sausages. Sausages of the uncooked variety, such as salami and summer sausage and cooked sausages, such as frankfurters and bologna sausage are typical examples. Both uncooked and cooked sausages may be smoked.

The usual process for manufacturing cooked sausages, for example, consists of grinding together meat trimmings until the meat has been reduced to relatively small particles. This mass of small meat particles is then transferred to a chopping machine in which the meat is comminuted into very fine particles. Comminution is accomplished by the use of rapidly operating knife blades which exert a chopping action upon the meat as it is passed under the blades. Under these conditions a substantial amount of heat is generated which is undesirable in the process. The heat is preferably counteracted by the addition of substantial quantities of chopped ice to the comminuted mass as it is passed under the chopping blades. As the ice melts it results in considerable amounts of water entering the mass of meat. This water may be absorbed by the meat itself, or by an added binder, or both.

It has been the common practice to add a binder consisting generally of floury or starchy materials, powdered skim milk, or other like products, capable of absorbing water which has not been absorbed by the meat itself. The amount of water which can be absorbed and carried by the comminuted meat mass is roughly inversely proportional to the fat content of the meat product. As the fat content is increased the ability of the meat to absorb and carry water is decreased. Hence the amount of binder required to absorb the water which has not been absorbed by the meat will be increased as the fat content of the meat product is increased. It is desirable that the meat absorb and retain as much of the water as possible, but adequate absorption of water has not been possible in the ordinary sausage because of a relatively high concentration of fat which may amount to as much as 60% by weight of fat.

It is an object of the present invention to provide comminuted meat products of improved quality in which the lean meat, fatty materials, liquids, binders, seasonings and other ingredients are present as a homogeneous mass.

Another object of the invention is to provide a meat product which is capable of absorbing and retaining a relatively large amount of liquid.

A further object of the invention is to provide a composition for incorporation into comminuted meat products which will assist in the combining of the ingredients into a homogeneous mass.

Another object of the invention is to provide a composition for incorporation into meat products which will serve to bind the meat ingredients of the product and will enhance the water absorption power of the meat.

A still further object of the present invention is to provide a composition and method for emulsifying fatty materials and aqueous liquids into a substantially stable emulsion.

In accordance with the present invention it is possible to prepare a comminuted meat product which is capable of absorbing and retaining a relatively large amount of water by the addition of a binder having new and unusual properties. The unusual emulsifying properties of the binder result in part from the incorporation therein of a small quantity of a dihydroxyphospholipid.

In the preparation of comminuted meat products, such as sausages, the incompatability of the fatty materials in the meat product and the water picked up by the meat during the comminution step can be greatly reduced or eliminated by bringing the fatty materials and the water together in the form of an emulsion. According to the present invention the fatty materials and water are brought together to form a substantially stable emulsion by the action of the new binder disclosed herein which contains a dihydroxyphospholipid as an emulsifying agent. This combination of fatty materials and binder containing a dihydroxyphospholipid emulsifier results in a sausage capable of absorbing relatively large quantities of water and retaining the fatty materials and water in a stable combination.

One form of the binder which represents a preferred embodiment of the present invention is prepared according to the following formula:

| | Percent by weight |
|---|---|
| First clear durum flour | 30 |
| Pregelatinized wheat starch | 27 |
| Potato starch | 40 |
| Dihydroxyphospholipid emulsifier | 3 |

Each of the individual ingredients in the formula outlined above has a specific purpose and function in achieving the unusual results obtained. The durum flour acts as an absorption material for the purpose of absorbing the water introduced into the meat product, both during the primary absorption period and during the secondary absorption period. By the primary absorption is meant the absorption which occurs during the chopping and mixing stages of the sausage manufacture. By the secondary absorption is meant the absorption which occurs during the smoking, cooking and cooling operations. The durum flour exhibits absorptive power during both periods and, therefore, is superior to ordinary raw wheat starch which has little primary absorption power. Durum flour has been found to be desirable also for the flavor it imparts to the finished sausage.

The pregelatinized wheat starch acts as a primary absorption material and is particularly active in the primary absorption period.

The raw potato starch has little effect as a primary absorption material, but is particularly active as a secondary absorption material during the smoking, cooking and cooling operations.

The dihydroxyphospholipid emulsifier has the unusual property of promoting the binding together of the water and fat even during the primary absorption period. Its principal action, however, occurs during the secondary absorption period in which the emulsifier not only promotes further emulsification of the fatty bodies and water, but also effectively promotes the absorption properties of the potato starch through some unusual cooperation between the emulsifier and the potato starch.

The binder described in the above formula is suitably prepared by premixing the dihydroxyphospholipid emulsifying compound with the potato starch in a suitable mixing apparatus, such as a vertical mixer, muller or a horizontal ribbon-type blender. A small amount of potato starch is first placed in the mixer and the entire amount of emulsifier is added and agitation of the mass is begun. Additional potato starch is added from time to time when it is noted that the emulsifier has been completed, distributed and dispersed in the potato starch already present. The optimum amount of potato starch which may be added can be measured by examining the product for the peculiar molding characteristics which a proper mixture of emulsifier and potato starch will have.

The mixing of a dihydroxyphospholipid with potato starch is more completely described in my copending application Serial No. 45,562, filed August 21, 1948, now U. S. Patent No. 2,513,638, patented July 4, 1950. The unusual nature of the potato starch-emulsifier composition makes it substantially more effective than a composition of a dihydroxyphospholipid with other types of amylaceous materials. In the first place, potato starch is more active as an absorber of water than other starch materials. Secondly, the dihydroxyphospholipid appears to become more thoroughly dispersed on potato starch. The exact nature of the unusual cooperation between the dihydroxyphospholipid emulsifier and potato starch is not definitely known, but it results in a more complete dispersion of the emulsifier throughout the meat product.

Although especially advantageous results have been obtained in the practice of the invention by the employment of durum flour, pregelatinized wheat starch and raw potato starch, it will be understood that other starchy polysaccharides of varying water absorptive capacities may be employed as, for example, wheat, rye, barley, oat, rice, corn, sweet potato, sago and cassava starches and flours. The pregelatinized forms of such starches may be used in place of the pregelatinized wheat starch described in the previous examples.

Pregelatinized starches differ from raw starches in that they disperse or swell in cold water and have a higher cold water absorptive capacity due to at least partial bursting or gelatinization of the starch granule. They may be made by applying the starch in an ungelatinized condition mixed with water to revolving hot rollers on which the starch is gelatinized and dried in the form of a thin film which is subsequently flaked off and ground to the desired degree of fineness. They can also be prepared by adding limited quantities of moisture to a normally air-dried starchy polysaccharide, steaming at substantially atmospheric pressure until partial bursting of the starch occurs, and subsequently drying and grinding the resultant product as described, for example, in Bauer U. S. Patent 2,216,179.

After the potato starch and emulsifier have been thoroughly mixed, the durum flour is added and mixing is continued until dispersion of the flour is complete. Then the pregelatinized wheat starch is added and the mix is again agitated until thorough dispersion has been achieved.

Another type of binder which has been found to have similar unusual properties may be prepared by carefully mixing about 6% of a dihydroxyphospholipid emulsifier with about 94% of a sugar in a mixing machine. The sugars contemplated by the invention include the dry, crystalline mono-saccharides, such as dextrose, the disaccharides such as sucrose, maltose and lactose, and the lower polysaccharides or dextrins. Obviously any of these sugars may be used alone or any suitable mixture of them may be employed. The invention is not limited to the percentages of sugar and emulsifier stated above, these being only one preferred combination. The dihydroxyphospholipid compound may be dispersed on the sugar in amounts ranging between 1.0% and 25.0% by weight.

It is preferred to add a small portion of the sugar and all of the emulsifier and to mix these until complete dispersion has been achieved. Then the remainder of the sugar may be added slowly until complete dispersion of the entire amount of sugar and emulsifier is accomplished. Running the dispersed product through a muller or mill will serve to achieve a greater degree of dispersion than is possible from ordinary mixing.

The binders described above may be added at any point in the sausage manufacturing process where binders would ordinarily be incoporated. This is usually done during the comminuting step. In the case of the starchy binder disclosed herein, it has been found that the inclusion of from 0.5% to 15.0% by weight of binder based on the weight of the meat in the meat product results in a substantially increased water absorption by the meat ingredients and the binder. The fatty materials in the meat and the water form a stable combination and the product retains a considerably larger amount of water than would ordinarily be the case. In the case of the sugary binder it has been found desirable to employ from 0.5% to 15.0% by weight of binder based on the weight of the meat. Here again unusually large amounts of water are absorbed and retained by the meat product.

In the preferred examples disclosed herein the dihydroxyphospholipid is incorporated in the amount of 3.0% by weight of the amylaceous binder and in the amount of 6.0% by weight of the sugary binder. The invention is not limited to these amounts since experience has shown that the dihydroxyphospholipid compound may be suitably employed in concentrations between about 1.0% and about 33.0% by weight of the binder.

While it has been shown herein that the preferred method of incorporating the dihydroxyphospholipid compound into a meat product is by means of a binder containing the emulsifier, the invention is not limited to this means of addition. The emulsifier may be incorporated into the meat product by simple addition at any time during processing, for example, prior to or during the comminution step. It should be noted, however, that the amount of emulsifier based upon the weight of the meat in the product is extremely small, and hence direct addition presents a problem of dispersing the emulsifier uniformly throughout the meat mass.

It has been found that the dihydroxyphospholipid emulsifier may be employed either alone or in a binder with appreciable results in amounts as small as .005% by weight based upon the weight of the meat in the product. In other instances from .03% to .09% by weight of emulsifier has been demonstrated to give very good results in emulsifying the fatty materials and water. It has been found that up to 1.0% by weight of dihydroxyphospholipid emulsifier can be incorporated into the comminuted meat product in order to achieve the desired emulsifying results. The addition of larger amounts would not be objectionable in itself since the dihydroxyphospholipids are edible compounds but the cost of the product would make larger additions impractical. Furthermore, it has been found that only a fraction of a percent by weight of the dihydroxyphospholipid is necessary to achieve the desired result. It is contemplated that, given the concentration of dihydroxyphospholipid in the binder, a user can easily determine the amount of binder which will give him between .005% and 1.0% by weight of dihydroxyphospholipid on the weight of meat.

The dihydroxyphospholipid compound which has been used to exceptional advantage in the present invention to emulsify the fatty materials and the water present in comminuted meat products, such as sausages, is a derivative of vegetable phosphatides. The dihydroxyphospholipid may best be characterized as the hydroxylation product of the unsaturated higher fatty acid groups in vegetable phosphatides, such as lecithin, cephalin and inositol phosphatides. Hydroxylation is carried out upon the double bonds of the unsaturated higher fatty groups in the phosphatides such that the degree of unsaturation of the product is reduced and its stability improved. Additionally its dispersibility in water or aqueous media is improved, probably due to the increase in the hydrophilic groups in the phosphatide molecule.

It will be seen from the foregoing disclosure that new and unusual results have been accomplished in the preparation of comminuted meat products by the addition of a dihydroxyphospholipid emulsifying compound to a meat binder. The invention contemplates the addition of the emulsifier to any and all kinds of comminuted meat products, such as canned and fresh, cooked and uncooked sausages. The meat products so treated are capable of absorbing and retaining much larger quantities of water than is ordinarily the case. Hence the products so prepared have unusual properties which have heretofore been unobtainable in comminuted meat products.

The invention is hereby claimed as follows:

1. A comminuted meat product comprising comminuted meat, aqueous liquid and a fraction of a percent of a dihydroxyphospholipid.

2. A comminuted meat product comprising comminuted meat, aqueous liquid and between about .005% and about 1.0% of a dihydroxyphospholipid.

3. A comminuted meat product comprising comminuted meat, aqueous liquid and about .03% to about .09% by weight of a dihydroxyphospholipid.

4. A comminuted meat product comprising comminuted meat and a binder which contains a dihydroxyphospholipid, said dihydroxyphospholipid being present in a fraction of a percent by weight based on the weight of the meat.

5. A comminuted meat product comprising comminuted meat and from about 0.5% to about 15.0% by weight of a binder which contains a dihydroxyphospholipid, said dihydroxyphospholipid being present in a fraction of a percent by weight based on the weight of the meat.

6. A comminuted meat product comprising comminuted meat and a binder which contains about 1.0% to about 33.0% by weight of a dihydroxyphospholipid, said dihydroxyphospholipid being present in a fraction of a percent by weight based on the weight of the meat.

7. A comminuted meat product comprising comminuted meat and about 0.5% to about 15.0% by weight of a binder containing about 1.0% to about 33.0% by weight of a dihydroxyphospholipid, said dihydroxyphospholipid being present in a fraction of a percent by weight based on the weight of the meat.

8. A comminuted meat product comprising comminuted meat and about 3.0% by weight of a binder which comprises about 30% by weight of durum flour, about 27% by weight of pregelatinized wheat starch, about 40% by weight of potato starch and about 3% by weight of a dihydroxyphospholipid.

9. A comminuted meat product comprising a comminuted meat and about 0.5% to about 1.0% by weight of a binder which comprises about 94% by weight of a sugar and about 6% by weight of a dihydroxyphospholipid.

10. A meat binder composition comprising essentially a plurality of starchy polysaccharides of varying water absorptive capacities and a dihydroxyphospholipid.

11. A meat binder composition comprising essentially a sugar and a dihydroxyphospholipid.

12. A meat binder composition comprising essentially a plurality of starchy polysaccharides of varying water absorptive capacities and a dihydroxyphospholipid, at least one of said starchy polysaccharides comprising a raw starch and another being a pregelatinized starch.

13. A meat binder composition comprising about 30% by weight of durum flour, about 27% by weight of pregelatinized wheat starch, about 40% by weight of potato starch and about 3% by weight of a dihydroxyphospholipid.

14. A meat binder composition comprising about 94% of a sugar and about 6% of a dihydroxyphospholipid.

15. A binder for comminuted meat products containing about 1.0% to about 33% by weight of a dihydroxyphospholipid, said binder being adapted to be incorporated with comminuted meat in making meat products in amounts from about 0.5% to about 15.0% by weight of the meat product.

16. The method of making a comminuted meat product which comprises intimately mixing comminuted meat with a fraction of a percent of a dihydroxyphospholipid.

17. The method of making a comminuted meat product which comprises intimately mixing comminuted meat with about .005% to about 1.0% by weight of a dihydroxyphospholipid.

18. The method of making a comminuted meat product which comprises intimately mixing comminuted meat with about .03% to about .09% by weight of a dihydroxyphospholipid.

19. The method of making comminuted meat products which comprises intimately mixing comminuted meat with about 3.0% by weight of a binder comprising about 30% by weight of durum flour, about 27% by weight of pregelatinized wheat starch, about 40% by weight of potato starch and about 3% by weight of dihydroxyphospholipid.

20. In the preparation of comminuted meat products containing a binder, the step which comprises incorporating into said binder a quantity of dihydroxyphospholipid sufficient to emulsify the fatty bodies and the aqueous liquids present in said meat product.

ELMER F. GLABE.

References Cited in the file of this patent

UNITED STATES PATENTS

| Number | Name | Date |
|---|---|---|
| 2,201,064 | Thurman | May 14, 1940 |
| 2,355,548 | Musher | Aug. 8, 1944 |
| 2,445,948 | Wittcoff | July 27, 1948 |
| 2,470,281 | Allingham | May 17, 1949 |